(12) United States Patent
Higuchi

(10) Patent No.: US 8,548,090 B2
(45) Date of Patent: Oct. 1, 2013

(54) TRANSMITTING APPARATUS AND METHOD IN MOBILE COMMUNICATIONS SYSTEM

(75) Inventor: Kenichi Higuchi, Saitama (JP)

(73) Assignee: NTT DoCoMo, Inc., Tokyo (JP)

( * ) Notice: Subject to any disclaimer, the term of this patent is extended or adjusted under 35 U.S.C. 154(b) by 347 days.

(21) Appl. No.: 12/863,883

(22) PCT Filed: Jan. 9, 2009

(86) PCT No.: PCT/JP2009/050225
§ 371 (c)(1),
(2), (4) Date: Aug. 26, 2010

(87) PCT Pub. No.: WO2009/093490
PCT Pub. Date: Jul. 30, 2009

(65) Prior Publication Data
US 2010/0316162 A1   Dec. 16, 2010

(30) Foreign Application Priority Data
Jan. 25, 2008   (JP) ................. 2008-015495

(51) Int. Cl.
*H04L 27/00* (2006.01)
(52) U.S. Cl.
USPC ........... 375/295; 375/296; 375/298; 375/300; 375/219
(58) Field of Classification Search
USPC ......................... 375/295, 296, 298, 300, 219
See application file for complete search history.

(56) References Cited

U.S. PATENT DOCUMENTS

| | | | | |
|---|---|---|---|---|
| 2005/0169411 A1* | 8/2005 | Kroeger | ......................... | 375/350 |
| 2007/0089015 A1* | 4/2007 | Saul | ............................... | 714/746 |
| 2007/0140367 A1* | 6/2007 | Braithwaite | ................... | 375/260 |
| 2007/0171994 A1* | 7/2007 | Parker et al. | .................. | 375/260 |
| 2008/0019453 A1* | 1/2008 | Zhao et al. | ..................... | 375/260 |

FOREIGN PATENT DOCUMENTS

| | | |
|---|---|---|
| CN | 1965553 A | 5/2007 |
| JP | 2007-529172 A | 10/2007 |
| JP | 2007-529173 A | 10/2007 |
| WO | 2005/096579 A1 | 10/2005 |
| WO | 2005/096580 A1 | 10/2005 |

OTHER PUBLICATIONS

International Search Report w/translation from PCT/JP2009/050225 dated Mar. 3, 2009 (3 pages).

(Continued)

*Primary Examiner* — Kenneth Lam
(74) *Attorney, Agent, or Firm* — Osha Liang LLP

(57) ABSTRACT

A transmitting apparatus in a mobile communications system is disclosed. The apparatus includes: a data modulating unit which maps a predetermined number of data sets to one or more reference signal points of a symbol constellation; an inverse Fourier transforming unit which inverse Fourier transforms a data-modulated signal, generating a time-domain signal; a peak suppressing unit which suppresses the time-domain signal such that a peak power decreases when the time-domain signal meets a predetermined condition; a Fourier transforming unit which Fourier transforms the peak-suppressed signal and generates a frequency-domain signal; and a modifying unit which modifies the frequency-domain signal, and provides the modified signal to the inverse Fourier transforming unit, wherein the modifying unit is arranged to move, when a peak-suppressed signal point in the symbol constellation does not belong to a predetermined surrounding area, the peak-suppressed signal point to a point within the surrounding area.

14 Claims, 8 Drawing Sheets

(56) References Cited

OTHER PUBLICATIONS

Written Opinion from PCT/JP2009/050225 dated Mar. 3, 2009 (3 pages).
Andoh, H. et al.; "Comparison of PAPR Reduction Methods for OFDM Signal with Channel Coding"; IEICE Technical Report RCS 2008-133; pp. 19-24; Nov. 19, 2008; (8 pages).
Krongold, Brian Scott et al.; "PAR Reduction in OFDM via Active Constellation Extension"; IEEE Transactions on Broadcasting, vol. 49, No. 3; pp. 258-268; Sep. 2003 (11 pages).
Office Action for Chinese Application No. 200980110378.4 dated Mar. 8, 2013, with English translation thereof (16 pages).
Espacenet, Patent Abstract for Chinese Publication No. 1965553 dated May 16, 2007 (1 page).

* cited by examiner

TRANSMITTING APPARATUS AND METHOD IN MOBILE COMMUNICATIONS SYSTEM

BACKGROUND OF THE INVENTION

1. Field of the Invention

The present invention generally relates to the technical field of mobile communications, and particularly relates to transmitting apparatuses and methods which transmit a signal using a multi-carrier scheme.

2. Description of the Related Art

In a multi-carrier modulation scheme, a symbol period can be increased and a guard interval can be inserted, etc., to effectively reduce multi-path interference, which is especially problematic in wideband radio communications. An orthogonal frequency division multiplexing (OFDM) scheme is especially promising in future radio communications systems. However, in the multi-carrier modulation scheme such as an OFDM scheme, each of multiple sub-carriers is mapped to a modulated signal independently. Therefore, a transmit signal in the time domain may exhibit a high peak power. Therefore, a large transmission power amplifier back off must be maintained. This ends up becoming a particularly large problem at a mobile terminal, in which decreased power consumption becomes important. For decreasing a peak power, or more specifically a peak-to-average power ratio (PAPR), a number of methods have been proposed in the past.

For example, a PTS (partial transmit sequence) method, an SLM (selected mapping) method, and an interleaving, etc., provides for changing a transmission scheme (data modulation scheme, a bit pattern in the frequency direction, a symbol interleave pattern, etc.), making the peak power small. In these methods, how the transmission scheme is changed must be reported from the transmitter to the receiver. Therefore, there is a problem that a radio resource is, to a certain extent, consumed for the reporting (signaling), which causes a corresponding decrease in data throughput. This problem causes a reduction in advantages for the OFDM of realizing high frequency utilization efficiency and high-quality transmission even in a multi-path environment.

A method which does not require signaling of auxiliary control information (side information) such as the transmission scheme includes a clipping and filtering scheme. This scheme suppresses amplitude of a signal component having a peak power in the time domain, and filters, using a time domain filter, an out-of-band distortion caused thereby. Suppressing the amplitude corresponds to distorting an original signal. In other words, it may also be said that the clipping and filtering scheme superimposes an intentionally interfering signal to an original signal such that the peak power decreases. This method, which directly decreases the peak power, has a strong tendency to cause a signal waveform to deviate from the original waveform, which is not preferable from a viewpoint of a received error rate of a signal.

Moreover, a tone reservation scheme divides sub-carriers into those for data transmission and those dedicated to peak suppression, amplitude and/or phase being set such that only the peak voltage is suppressed in the latter. This method, which makes it possible to maintain the sub-carrier signal for the data transmission, is preferable from the point of view of a signal error rate. However, some sub-carriers which are not to be used in data transmission have to be secured, so that a corresponding amount of decrease in the data throughput occurs.

Schemes devised in light of these problems as described above include an ACE (Active Constellation Extension) scheme. The ACE scheme, which also assumes the clipping and filtering scheme, superimposes an intentional interference signal to the original signal. The ACE scheme is devised such that a symbol receive error rate does not degrade.

FIG. 1 shows a symbol constellation of a transmit signal used in a QPSK scheme. As shown, one each of the respective reference signal points $S_1$, $S_2$, $S_3$, and $S_4$ is shown for each quadrant. Distorting a signal waveform such that a peak power decreases corresponds to remapping a signal point being mapped in alignment with each reference signal point to a point which is somewhat distant from the reference signal point. In this case, what allows any remapping is the above-described clipping and filtering scheme. In the ACE scheme, a remapping to an area with a wavy line arrow and an area which is shaded is allowed, but remapping to others is prohibited. For example, remapping, to $T_1$, a signal point which was mapped to the reference signal point $S_1$ is allowed, but mapping the same to $T_2$ is prohibited. For convenience of illustration, the shaded area is drawn such that it represents a bounded square, but theoretically corresponds to an unbounded area. Remapping in such an area makes it possible to distort a signal waveform (i.e., suppress the peak power) without impacting signal point symbol determination. This is because the results of a hard decision on the signal point $T_1$ always reach the reference signal point $S_1$. The ACE scheme as described above is disclosed in Non-patent document 1.

Non-patent document 1: B. S. Krongold and D. L. Jones, "PAR Reduction in OFDM via Active Constellation Extension," IEEE Trans. on Broadcasting, Vol. 49, No. 3, pp. 258-268, September 2003.

SUMMARY OF THE INVENTION

Problem(s) to be Solved by the Invention

Now, when the signal point $S_1$ in FIG. 1 is remapped to $T_1$, the signal power for the symbol ends up increasing. The peak power may be suppressed, but the average signal power could end up increasing. Moreover, when the number of multiple modulation levels increase, the capability to suppress the peak power decreases.

FIG. 2 shows a symbol constellation used in a 16 QAM scheme. In FIG. 2, as in FIG. 1, areas to which a signal point may be remapped are shown as an area with a wavy line arrow and a shaded area. As shown, with the 16 QAM scheme, an outer reference signal point may be remapped to an area with a wavy line arrow or a shaded area, but four reference signal points neighboring the origin cannot be remapped to another signal point. Therefore, the capability to suppress the peak power ends up becoming weak. Such a trend becomes salient with an increase in the number of multiple modulation values. Moreover, an area which may be remapped, as shown, functions to increase the signal power, so that the average signal power could end up increasing even if the peak power could be suppressed.

When channel encoding for error correcting is applied to a transmit bit sequence and a soft-decision decoding is performed at the receiver, in the ACE scheme, a large deviation in a transmit signal point may cause a likelihood at a bit level at the receiver to be greatly different. In the soft-decision decoding process, signals of relatively the same degree of likelihood leads to a better functioning of the error correcting, so that it is not preferable for bit signals of extremely different likelihoods to appear in the middle of the soft-decision decoding process. In other words, there is a problem that an offset of a signal point that is allowed in the ACE scheme does not necessarily contribute to an increased accuracy from a point of view of the soft-decision decoding process.

The problem to be solved by the present invention is to seek a decreased peak and average powers of multi-carrier signals.

Means for Solving the Problem

According to one embodiment of the present invention, a transmitting apparatus in a mobile communications system is provided. The transmitting apparatus includes:

a data modulating unit which maps a predetermined number of data sets to one or more reference signal points of a symbol constellation; an inverse Fourier transforming unit which inverse Fourier transforms a data-modulated signal, generating a time-domain signal; a peak suppressing unit which suppresses the time-domain signal such that a peak power decreases when the time-domain signal meets a predetermined condition; a Fourier transforming unit which Fourier transforms the peak-suppressed signal and generates a frequency-domain signal; and a modifying unit which modifies the frequency-domain signal, and provides the modified signal to the inverse Fourier transforming unit, wherein, the modifying unit, is arranged to move, when a peak-suppressed signal point in the symbol constellation does not belong to a predetermined surrounding area which surrounds the respective reference signal points, the peak-suppressed signal point to a point within the surrounding area.

Advantage of the Invention

The present invention makes it possible to achieve decreased peak and average powers of multi-carrier signals.

DESCRIPTION OF THE PREFERRED EMBODIMENTS

Figure 1:
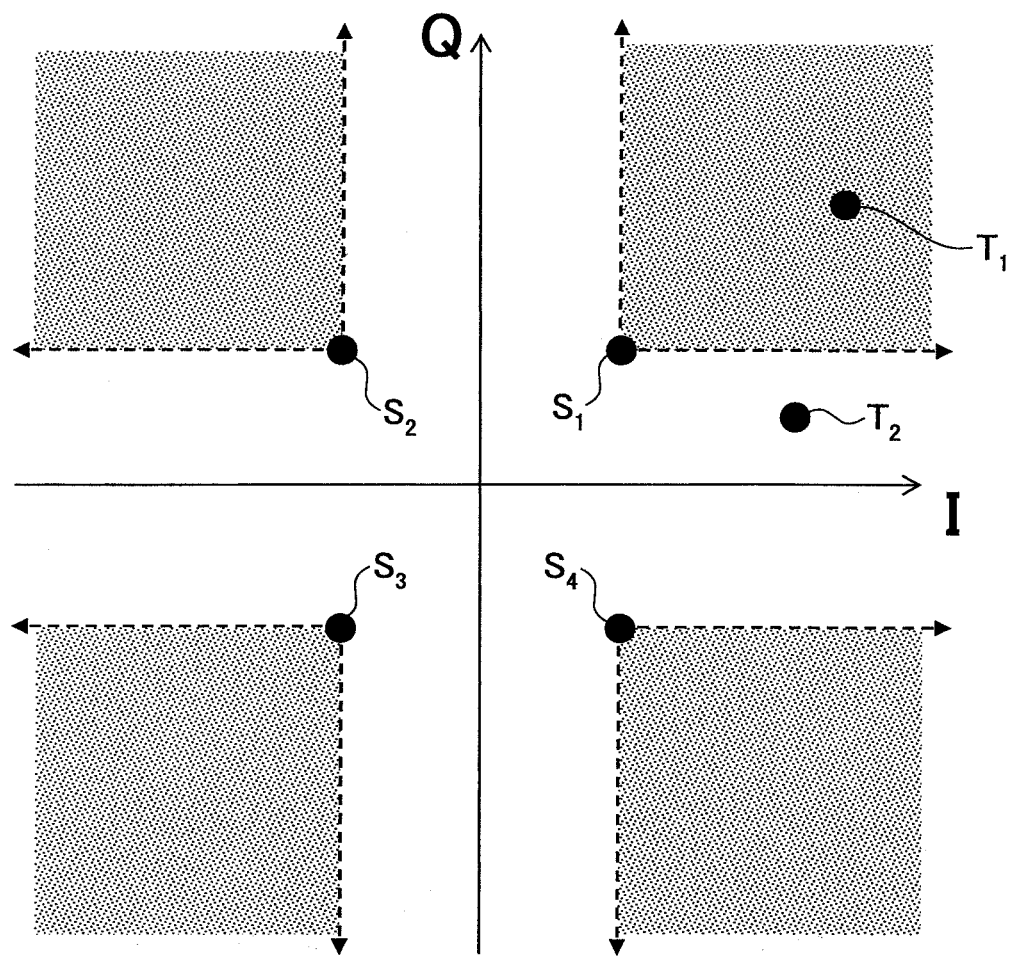
FIG. 1 is a diagram illustrating an area to which remapping is possible in an ACE scheme for QPSK.
Figure 2:
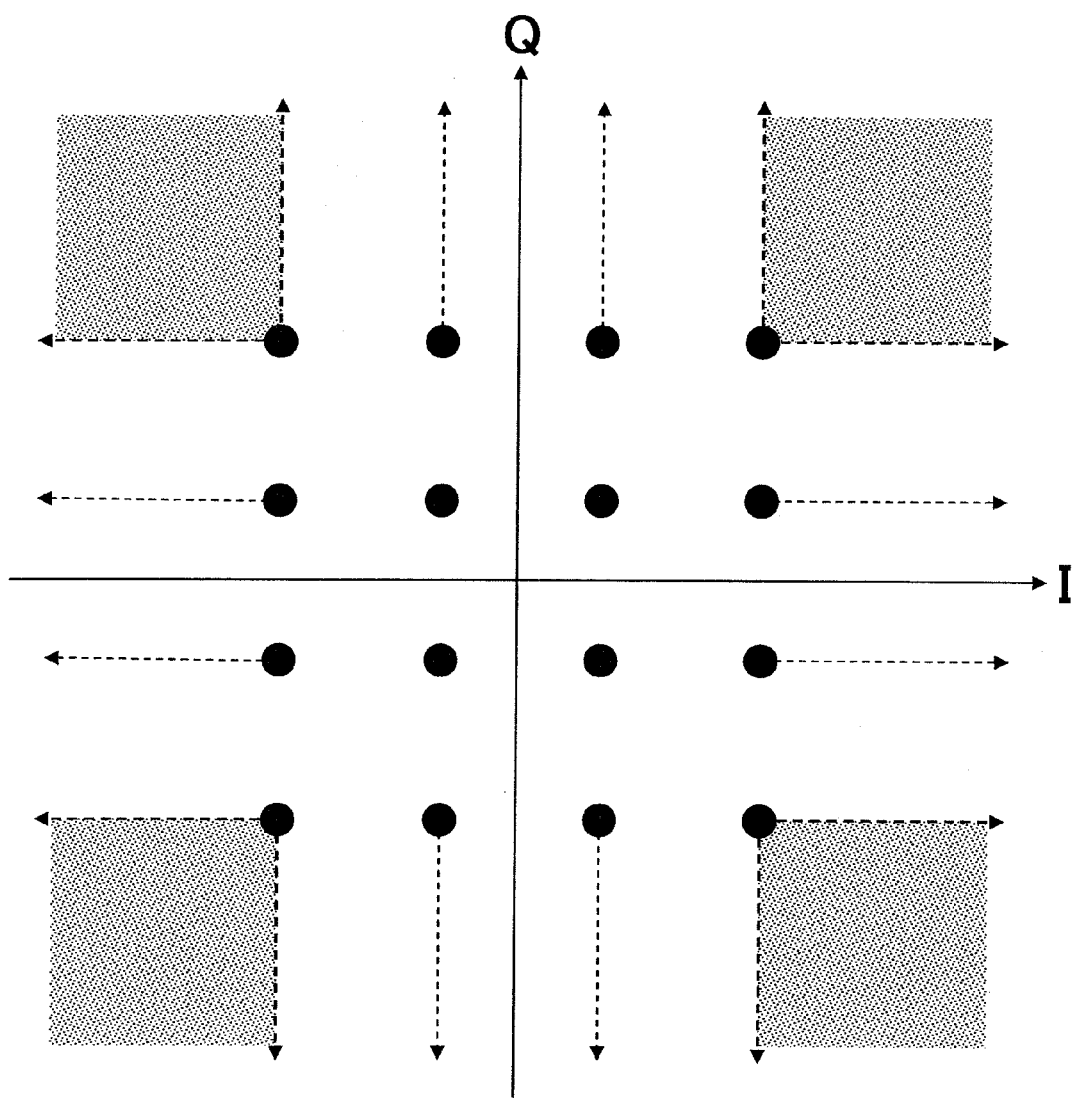
FIG. 2 is a diagram illustrating the area to which remapping is possible in the ACE scheme for 16QAM.

Description of Notations 111 mapping unit; 112, 114 switching units; 113 inverse Fourier transforming unit; 115 radio unit; 116 determining unit; 117 peak suppressing unit; 118 fast Fourier transforming unit; 119 modifying unit

BEST MODE OF CARRYING OUT THE INVENTION

In one embodiment of the present invention, when a peak-suppressed signal point in s symbol constellation does not belong to a predetermined surrounding area which surrounds respective reference signal points, the peak-suppressed signal point is moved to a point within the surrounding area. Such a point movement is preferable not only from a viewpoint of peak suppression, but also from a viewpoint of transmission signal power saving. The surrounding area spreads not only in a direction specific to a reference signal point, but also in all directions with the reference signal point as a center. Therefore, for any of the reference points, a peak suppression effect may be secured to some extent, which greatly differs from a conventional ACE scheme. The surrounding area spreads within a limited range within which the reference signal point is located. If a soft decision decoding is performed, likelihoods at the bit level becomes equivalent (no salient different exists), thereby making it possible to perform a highly-accurate soft-decision decoding.

The predetermined condition may be that a peak voltage of a time-domain signal exceeds a predetermined value.

It may be arranged such that, when the peak-suppressed signal point in the symbol constellation does not belong to the predetermined surrounding area which surrounds the respective reference signal points, the peak-suppressed signal point is moved to a reference signal point within the surrounding area, or such that, when the peak-suppressed signal point in the symbol constellation does not belong to the predetermined surrounding area which surrounds the respective reference signal points, the peak-suppressed signal point is moved to a point on a border of the surrounding area. Therein, it may be arranged that one of orthogonal modulation components is equally maintained between the peak-suppressed signal point and the point on the border. Alternatively, it may be arranged that the point on the border of the surrounding area is positioned on a straight line which links two points, one of which points being before the peak suppression and the other being after the peak suppression.

Each of the surrounding areas is arranged to be a circular area which surrounds a reference signal point corresponding to each, or a square area which surrounds the reference signal point corresponding to each.

In the modifying unit, a modification scheme may differ for a data sub-carrier and for a null sub-carrier. More specifically, for the data sub-carrier, the peak-suppressed signal point may be moved to the point within the surrounding area when the peak-suppressed signal point in the symbol constellation does not belong to the predetermined surrounding area which surrounds each of the reference signal points. Then, for the null sub-carrier, it may be arranged for the peak-suppressed signal point to be moved such that a peak-suppressed signal power takes a value which is no more than a predetermined value.

The transmitting apparatus may be provided at a radio base station of the mobile communications system.

According to one embodiment of the present invention, a method for use in a transmitting apparatus in a mobile communications system is provided. The method includes:

a data modulating step of mapping a predetermined number of data sets to a reference signal point within a symbol constellation; an inverse Fourier transforming step of inverse Fourier transforming a data-modulated signal, generating a time-domain signal; a peak suppressing step of suppressing the time-domain signal such that a peak power decreases when the time-domain signal meets a predetermined condition; a Fourier transforming step of Fourier transforming the peak-suppressed signal and generating a frequency-domain signal; and a modifying step of modifying the frequency-domain signal, and make the modified signal the data-modulated signal in the inverse Fourier transforming step, wherein the modifying step is arranged to move, when a peak-suppressed signal point in the symbol constellation does not belong to a predetermined surrounding area which surrounds the respective reference signal points, the peak-suppressed signal point to a point within the surrounding area.

The transmitting apparatus may be a radio base station which wirelessly communicates with a user apparatus. In this case, the method may be used only for transmission data for the user apparatus conducting a signal transmission at a rate lower than a predetermined transmission rate.

Moreover, the transmitting apparatus may be a user apparatus which wirelessly communicates with the radio base station.

While specific numerical value examples are used to facilitate understanding of the present invention, such numerical values are merely examples, so that any appropriate value may be used unless specified otherwise.

Embodiment 1

Figure 3:
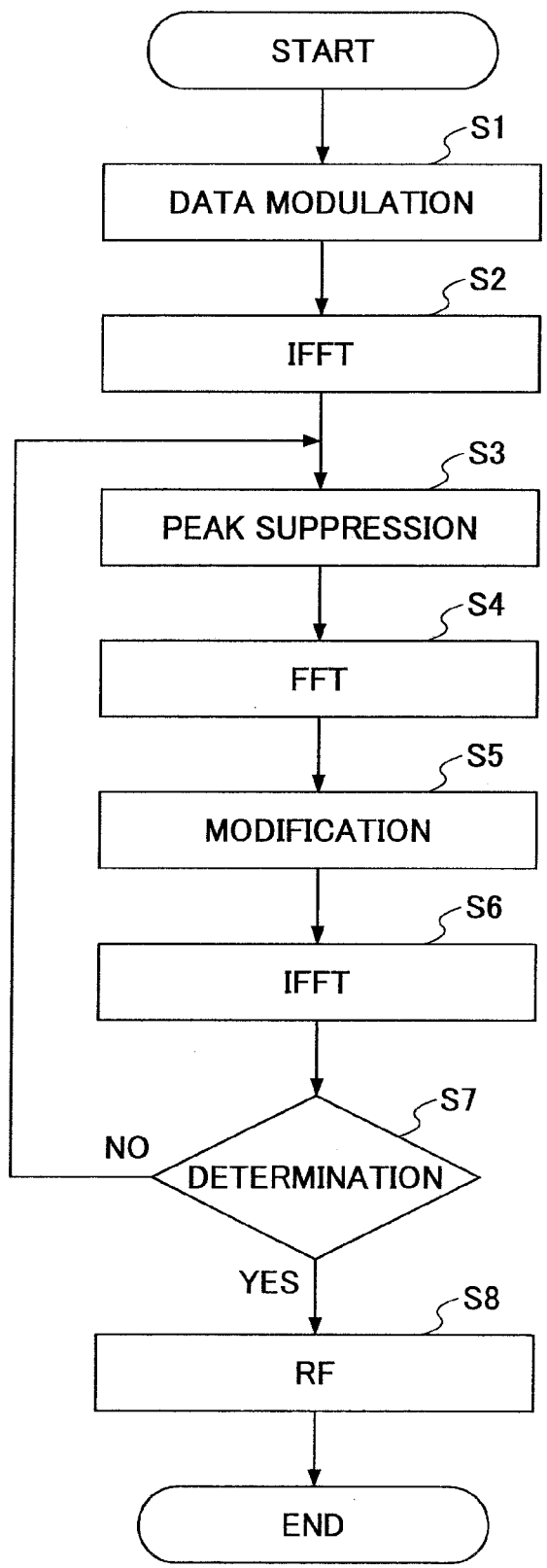
FIG. 3 is a flowchart illustrating an exemplary operation according to one embodiment of the present invention.

FIG. 3 is a flowchart illustrating an exemplary operation according to one embodiment of the present invention. In the present embodiment, an OFDM signal is provided. In step S1, data to be transmitted are modulated using some data modulation schemes. Of sequences of data that represent control data or user traffic data, a predetermined number of data sets are mapped to one reference signal point on a symbol constellation. For example, for a QPSK scheme, two sets of data are mapped to any of four reference signal points (corresponding to $S_1$, $S_2$, $S_3$, and $S_4$ in FIG. 1). Data to be mapped are typically channel-encoded data, but do not have to be channel encoded. When an AMC (adaptive modulation and channel encoding) control is performed, a data modulation scheme, etc., is appropriately changed.

In step S2, the data modulated signal is inverse fast Fourier transformed. In this way, a signal in the frequency domain is transformed to a time-domain signal.

In step S3, a peak voltage of the time-domain signal is suppressed. In other words, an intentional interference signal is superimposed on the time-domain signal such that a peak voltage is suppressed.

In step S4, a peak power suppressed signal is fast Fourier transformed, and a frequency-domain signal corresponding to a peak-power suppressed time-domain signal is derived.

In step S5, a modifying process is performed on the frequency-domain signal.

Figure 4:
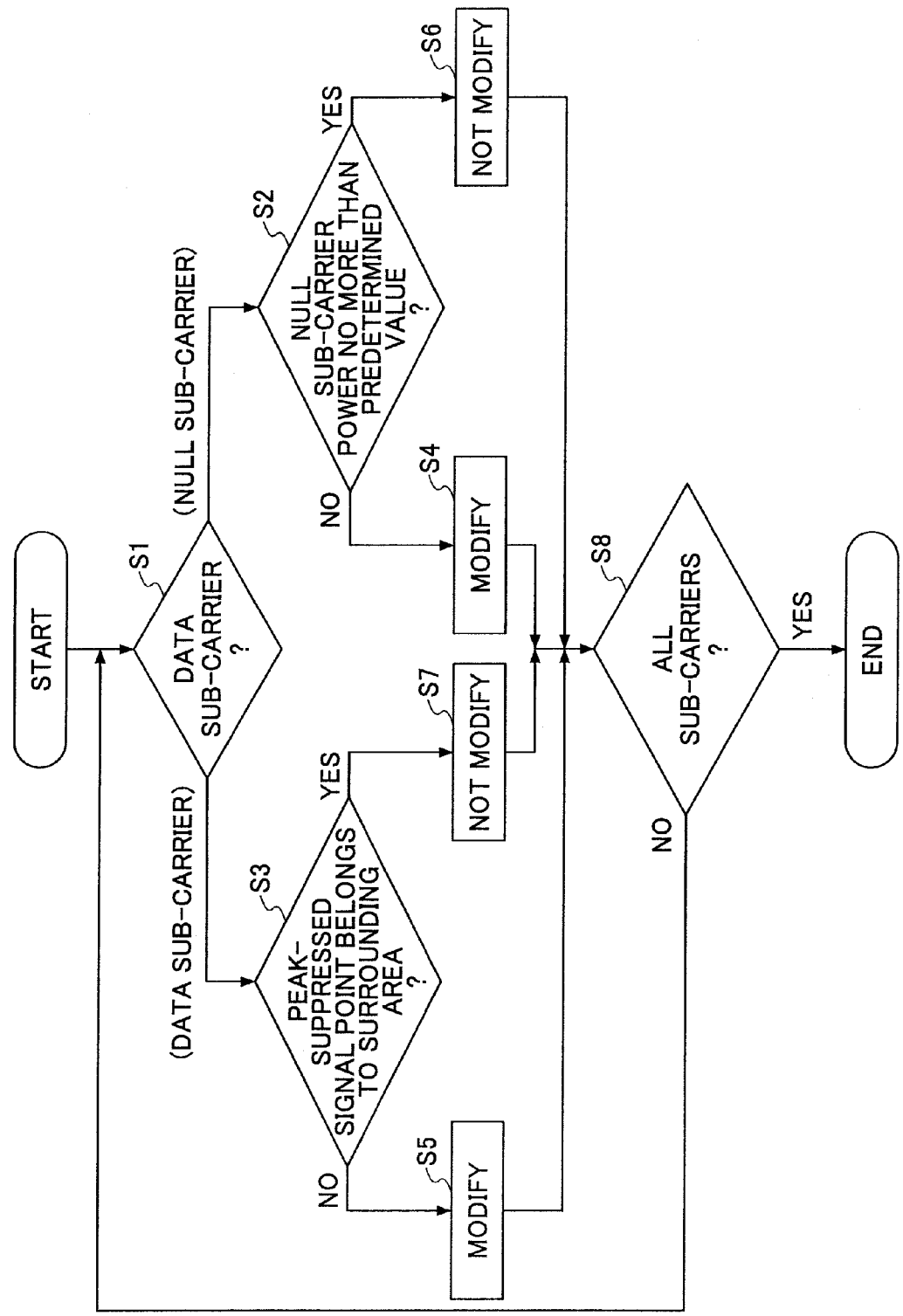
FIG. 4 is a detailed flowchart for performing a modification process (S5) in FIG. 3.

FIG. 4 is a detailed flowchart for performing a modification process. The modification process is performed on a signal point on each sub-carrier. In step S1, it is determined first whether a sub-carrier to be considered is a data sub-carrier or a null sub-carrier. The data sub-carrier is a sub-carrier within a bandwidth usable for data transmission. The null sub-carrier is a sub-carrier outside the bandwidth usable for data transmission. (In this connection, a sub-carrier secured in the above-mentioned tone reservation scheme is the sub-carrier within the bandwidth usable for data transmission, and is different from the null sub-carrier.) If the sub-carrier is the null sub-carrier, the process proceeds to step S2, and if it is the data sub-carrier the process proceeds to step S3.

In step S3, it is determined whether the peak-power suppressed signal point belongs to a predetermined surrounding area. In the present embodiment, a certain surrounding area is set that surrounds respective reference signal point within a symbol constellation.

Figure 5:
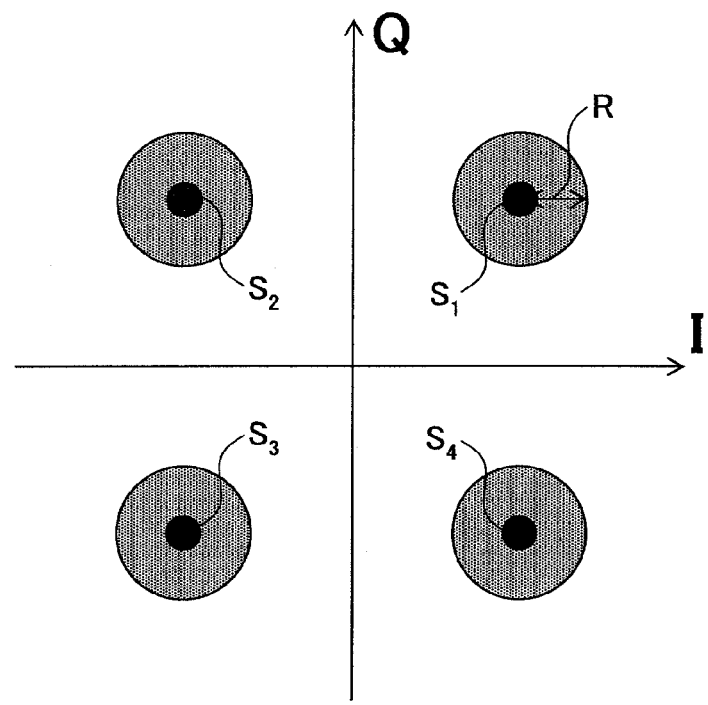
FIG. 5 shows a surrounding area (in case of a QPSK scheme) which can be set up according to an embodiment of the present invention.

FIG. 5 shows surrounding areas which can be set for a QPSK scheme. The illustrated surrounding areas are set as circular areas with a radius R that surround the respective reference signal points $S_1$, $S_2$, $S_3$, and $S_4$. The diameter (2 times R) of a circle is set as a certain proper value which is smaller than a distance between neighboring reference signal points.

Figure 6:
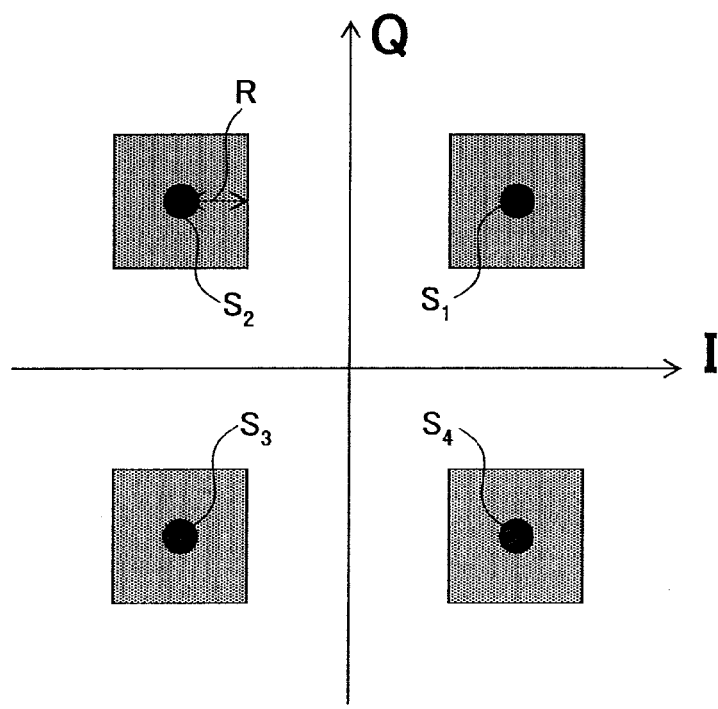
FIG. 6 shows a different surrounding area (in case of the QPSK scheme) which can be set up according to one embodiment of the present invention.

FIG. 6 shows different surrounding areas which can be set for the QPSK scheme. The illustrated surrounding areas are set as areas of a square R with each side of 2 times R, which side surrounding the respective reference signal points $S_1$, $S_2$, $S_3$, and $S_4$. The length (2 times R) of one side is also set as a certain proper value which is less than the distance between neighboring reference signal points.

Figure 7:
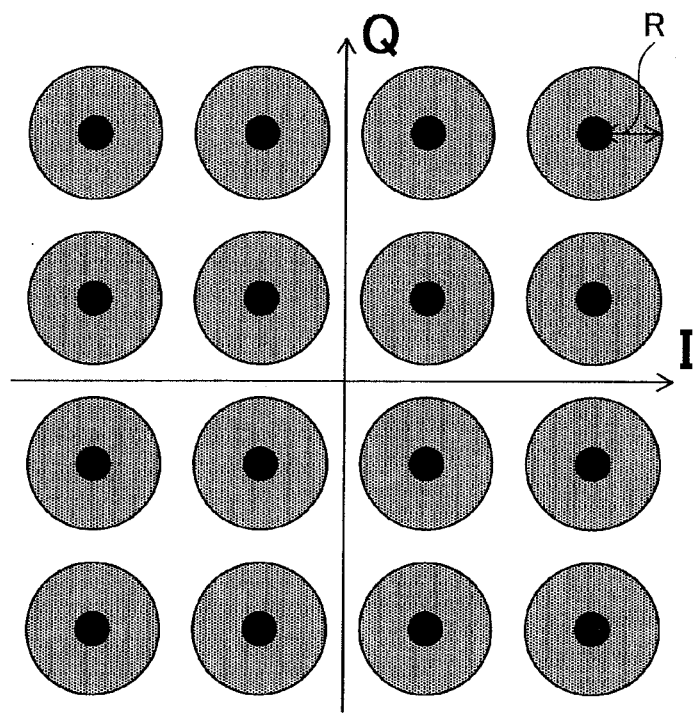
FIG. 7 shows a surrounding area (in case of a 16QAM scheme) which can be set up according to one embodiment of the present invention.

FIG. 7 shows surrounding areas which can be set for a 16QAM scheme. The illustrated surrounding areas are set as circular areas with a radius R that surround the respective reference signal points. The diameter (2 times R) of a circle is set as a certain proper value which is less than a distance between neighboring reference signal points.

Figure 8:
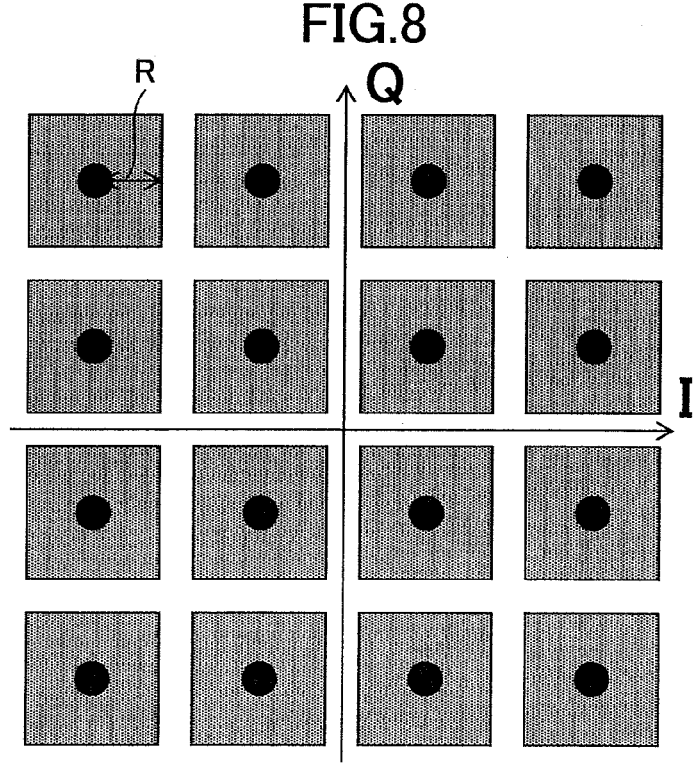
FIG. 8 shows a different surrounding area (in case of the 16QAM scheme) which can be set up according to one embodiment of the present invention.

FIG. 8 shows different surrounding areas which can be set for a 16 QAM scheme. The illustrated surrounding areas are set as areas of a square R with each side of 2 times R, which one side surrounding the respective reference signal points. The length (2 times R) of one side is also set as a certain proper value which is less than a distance between neighboring reference signal points.

In this way, in one embodiment of the present invention, a surrounding area is set that surrounds the respective reference signal points, to each of which a predetermined set of data is mapped, the respective surrounding areas having the same level of bounded areas regardless of a data modulation scheme. These matters largely differ from areas used for the ACE scheme. The data modulation scheme is not limited to QPSK and 16QAM, so that any multi-value modulation scheme may be used.

In step S3 in FIG. 4, it is determined whether the peak-power suppressed signal point belongs to a predetermined surrounding area. The signal point before peak power suppression is associated with a reference signal point within the surrounding area. As described above, when a time-domain signal is deformed (when the time-domain signal is superimposed by an interference signal), signal points mapped to individual sub-carriers may move to points which deviate from the reference signal point. In step S3, for a signal point being mapped to a data sub-carrier to be considered, it is determined whether the peak-power suppressed signal point falls within the circular area in FIG. 5, for example. If falling therein, the process proceeds to step S7, and for a signal point which is mapped to the sub-carrier, no modification is applied, and the process proceeds to step S8. As a result of a determination in step 3, if the peak power-suppressed signal point does not fall within a surrounding area corresponding to the signal point, the process proceeds to step S5.

In step S5, the peak power suppressed signal point is modified (re-mapped) such that it is modified (re-mapped) within a surrounding area related to the signal point.

Figure 9:
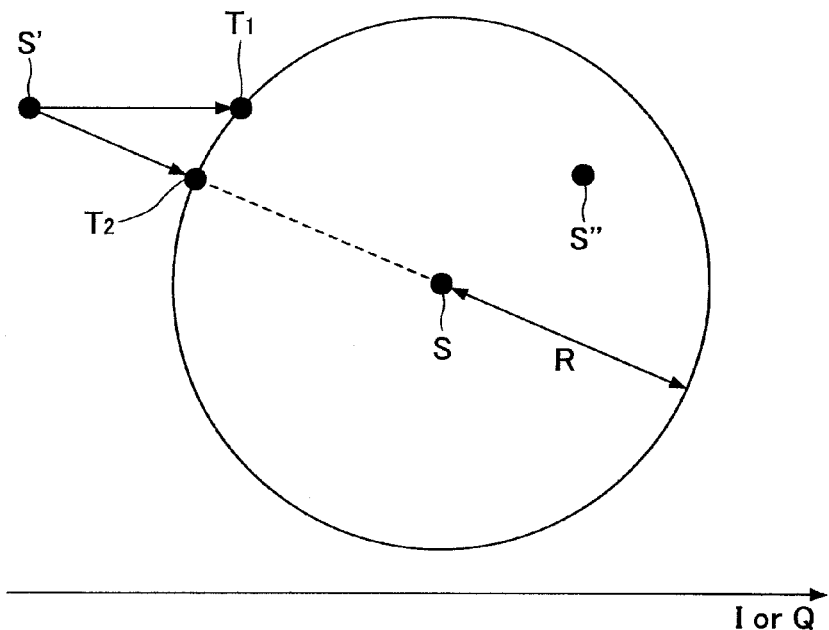
FIG. 9 is a drawing showing how the signal point is move to within the surrounding area.

FIG. 9 is a drawing showing how the signal point is transferred to within the surrounding area. The surrounding area is an area within a circle with a radius R centered on a reference signal point S. Suppose that, with a set of data being mapped to a reference signal point S, the peak power suppression moves the signal point to S'. In the present embodiment, the surrounding area also includes a border.

As an example, the signal point S' may be moved to a point $T_1$ on a border that has an equal I component or a Q component. When the signal point S' is moved to a different point, the effect of peak suppression ends up decreasing. From a point of view of maintaining as large peak suppression as possible, it is preferable to move it to a point on the border. When the signal point S' is moved back to the reference signal point S, a peak suppression effect contributed by the sub-carrier becomes zero. From a viewpoint of simplifying a point transformation, as in a case of the signal point $T_1$, it is preferable to make I component or Q component the same as for the signal point S'. Alternatively, from a viewpoint of simplifying a point transformation while maintaining an amount of phase rotation when the signal point S is changed to S' the signal point is preferably moved to a point on a straight line which passes through signal points S and S'. From such a viewpoint, as for the signal point $T_2$, the signal point is preferably moved to a point of intersection between the straight line which links the signal points S and S' and a border for the surrounding area.

As shown, as a result of peal suppression, when the signal point is moved from S to S", it is in the surrounding area, so that a position of the signal point is not modified. This corresponds to a case such that the process proceeds from step S3 to step S7 in FIG. 4.

Figure 10:
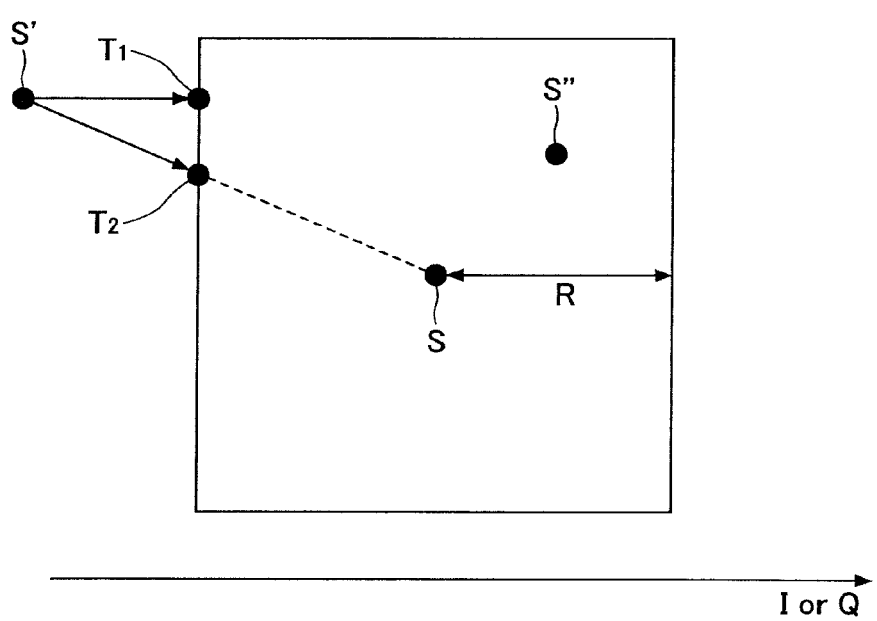
FIG. 10 is a drawing showing how the signal point is moved to within the different surrounding area.

FIG. 10 is a drawing showing how the signal point is moved to within the different surrounding area; In this case, the surrounding area forms a square whose side surrounding the reference signal point S is 2 times R. Except for a point with a different border area shape. the point transformation which is similar to what has been described in conjunction with FIG. 9 may be performed.

In the step S5 in FIG. 4, the point transformation such as shown in FIGS. 9, 10, etc., is performed to modify a signal point mapped to a sub-carrier to be considered. Thereafter, the process proceeds to step S8.

When it is determined in step S1 that the sub-carrier to be considered is the null sub-carrier, the process proceeds to step S2.

In step S2, a signal power associated with the null sub-carrier is determined. The null sub-carrier corresponds to an out-of-band frequency, so that it becomes an out-of-band radiation if such a signal power exists. In step S2, it is determined whether such an out-of-band radiation is within an allowable range. If it is not in the allowable range, the process proceeds to step S4.

In step S4, a signal power which is associated with the null sub-carrier falls within an allowable range. Ideally, it is preferable for the out-of-band radiation to be zero, so that it may be also be possible to uniformly set such a signal power to be zero. Alternatively, the out-of-band radiation within the allowable range may be used to suppress a peak power even a little. After the signal power of the null sub-carrier is modified, the process proceeds to step S8.

In step S2, in a case such that the signal power associated with the null sub-carrier is within an allowable range (including a case such that it is zero), the process proceeds to step S6, where the null sub-carrier is not modified, and then the process proceeds to step S8.

In step S8, it is determined whether necessary modifications have been performed for all of the sub-carriers. If there is any sub-carrier unconsidered, the process returns to step S1, where the above-described process is performed. If the process is completed for all of the sub-carriers, step S5 (modification process) in FIG. 3 is completed, and the process proceeds to step S6 in FIG. 3.

In step. S6 in FIG. 3, the modified signal is inverse fast Fourier transformed and a time-domain signal is generated for the modified signal.

In step S7, it is determined whether the time-domain signal meets a predetermined condition. The predetermined condition may be expressed, for example, as a PAPR not exceeding a predetermined value, an out-of-band signal level not exceeding a predetermined value, or a cubic metric (a metric calculated based on a third power of an amplitude) not exceeding a predetermined value. At any rate, the predetermined condition is a condition for determining that a peak-suppressed signal is suitable for radio transmission. If the predetermined condition is not met, the process returns to step S3, so that the above-described process is repeated. If the predetermined condition is met, the process proceeds to step S8.

In step S8, the processed signal is appended a guard interval, for example, and is converted to a signal for wirelessly communicating in OFDM, which signal is transmitted to complete the process.

Figure 11:
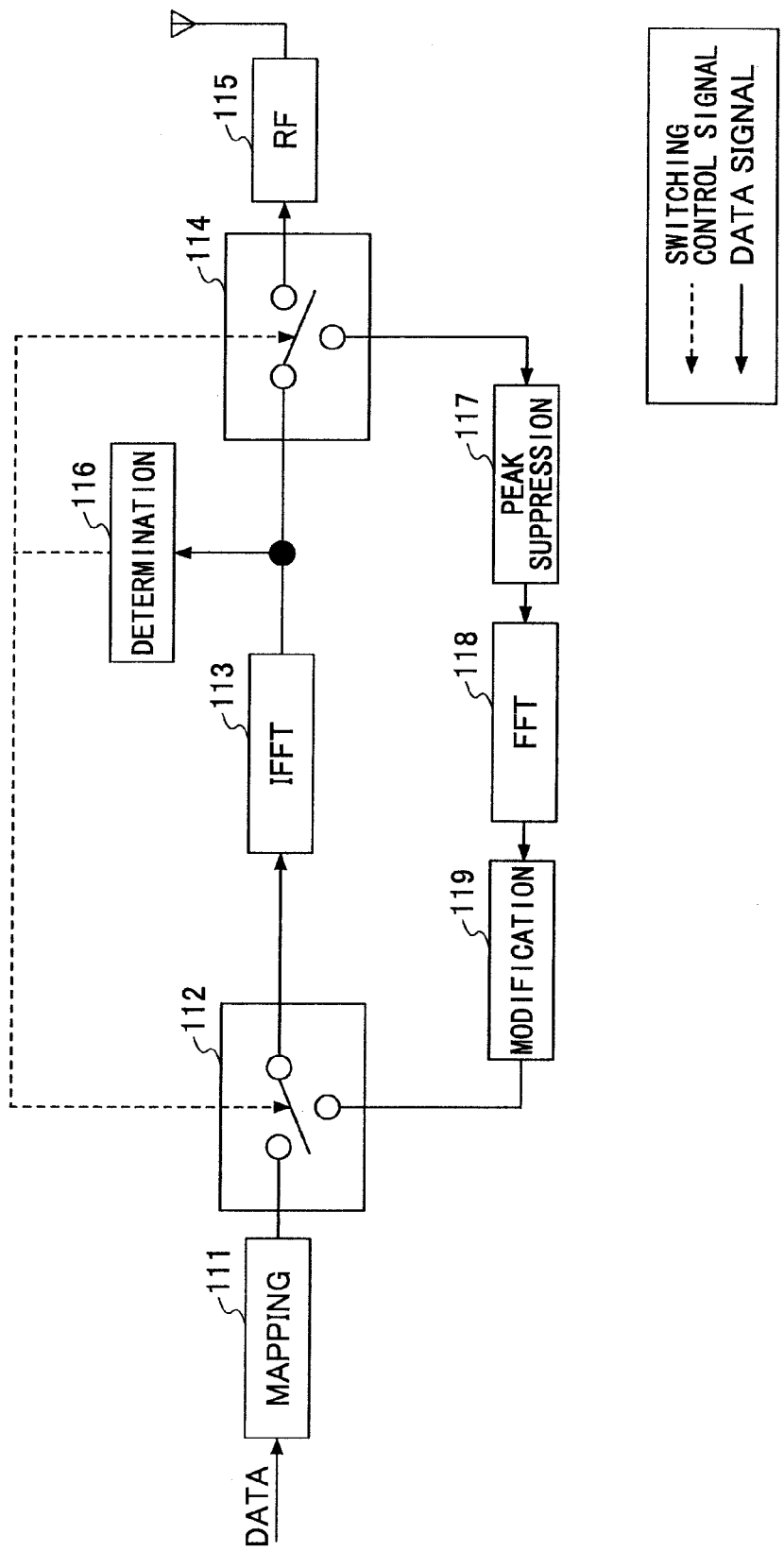
FIG. 11 is a functional block diagram of a transmitting apparatus according to one embodiment of the present invention.

FIG. 11 is a schematic functional block diagram of a transmitting apparatus according to an embodiment of the present invention. The transmitting apparatus may be provided at any apparatus which transmits a signal using a multi-carrier modulation scheme represented by OFDM. Typically, the transmitting apparatus is provided at a radio base station of a mobile communications system. FIG. 11 shows a mapping unit 111, switches 112 and 114, an inverse fast Fourier transforming unit 113, a radio unit 115, a determining unit 116, a peak suppressing unit 117, a fast Fourier transforming unit 118, and a modifying unit 119.

The mapping unit 111 performs data modulation and maps a predetermined number of sets of data that represent user traffic data or control data to one signal point on a signal constellation. The data modulation scheme may be constantly maintained or may be changed as appropriate.

The switches 112 and 114 switches signal transmission paths in response to a switching control signal from the determining unit 116, which is described below.

The inverse fast Fourier transform (IFFT) unit 113 inverse fast Fourier transforms a modified or unmodified data-modulated signal, transforming a frequency-domain signal to a time-domain signal.

The radio unit 115 appends a guard interval to the time-domain signal from the IFFT unit 113, and converts the same to a signal for wireless transmission. The guard interval may be provided as a cyclic prefix (CP).

The determining unit 116 determines whether the time-domain signal from the IFFT unit 113 meets a predetermined condition, and determines what is in the switching control signal according to the determined result. The predetermined condition may be expressed, for example, as a PAPR not exceeding a predetermined value, an out-of-band signal level not exceeding a predetermined value, or a cubic metric not exceeding a predetermined value. At any rate, the predetermined condition is a condition for determining that a peak-suppressed signal is suitable for radio transmission. If the predetermined condition is not met, the switch 112 and 114 are switched using a switching control signal such that a signal from the IFFT unit 113 is provided to the peak suppressing unit 117 and a signal from the modifying unit 119 is provided to the IFFT unit 113. If the predetermined condition is met, the switch 112 and 114 are switched using the switching control signal such that a signal from the IFFT unit 113 is provided to the radio unit 115 and a signal from the mapping unit 111 is provided to the IFFT unit 113.

The peak suppressing unit 117 suppresses the time-domain signal such that a peak power is suppressed.

The fast Fourier transforming unit (FFT) unit 118 fast Fourier transforms the peak-power suppressed time-domain signal, generating a frequency-domain signal.

The modifying unit 119 modifies a signal of the frequency domain. The modifying method is a method as described in conjunction with step S5 in FIG. 3.

The method for suppressing a peak power and modifying a signal point according to the present embodiment may be applied to any mobile communications system which transmits a signal in a multi-carrier transmission scheme represented by an OFDM scheme. In a case the present embodiment is used for a radio base station when the OFDM scheme is adopted for downlink, the present method may be applied to all user apparatuses, or it may be applied on a limited basis to some user apparatuses. For example, it may be arranged such that the present method is applied to a user using a data modulation scheme with a low data rate (more precisely, an MCS with a low data rate) and the present method is not applied to a user using a data modulation scheme with a high data rate (more precisely, an MCS with a high data rate). A combination of MCS (modulation and channel coding schemes) shows a combination of a data modulation scheme and a channel coding scheme (or a data size).

From a viewpoint of suppressing a peak power and saving a transmission power, it may be preferable to uniformly suppress power for all users. However, when the peak power is suppressed, a signal error rate may end up being increased. The method according to the present embodiment makes it more difficult to increase a signal error rate in comparison to a conventional method, but, even so, some signal error rate may occur. The signal error rate causes a more detrimental effect on a system throughput with a higher data transmission speed. For example, suppose that the signal error rate is 10% (in practice, it does not become as high. It is an exemplary numerical figure for brevity of explanation.) For example, for a user transmitting a signal at 500 kbps in QPSK, the signal transmission speed degrades to approximately 450 kbps. However, for a user transmitting a signal at 10 Mbps in 64QAM, the signal transmission speed becomes approximately 9 Mbps, or degrades by 1 Mbps. The effects of suppressing the peak power and modifying the signal point are greater for a user conducting data transmissions at a higher speed. Thus, as in the above, it may be arranged to apply the method according to the present embodiment not to the high-speed user, and only to the low-speed user. Even for the low-speed user, the data rate degradation may occur, which does not have a major effect on a throughput of the overall system. Moreover, the fact that it is low speed means that a data modulation scheme (MCS) which is less prone to error is used, so that error tolerance is higher relative to the high-speed user. In this way, a power resource of a base station may be saved while maintaining the throughput of the overall system at a high level.

Moreover, in a case the present embodiment is used for a radio base station when an OFDM scheme is adopted for uplink, the present method may be applied to all user apparatuses, or it may be applied on a limited basis to some user apparatuses. For example, it may be arranged to apply the present method only to a user apparatus located near a cell edge (with a severe transmission power restriction) that requires peak suppression. Moreover, for the user apparatus located near the cell edge, a data modulation scheme (MCS) which is less prone to error is used, so that error tolerance is high, making it possible to expect a larger peak suppression effect.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. A breakdown of embodiments or items is not essential to the present invention, so that matters described in two or more embodiments or items may be used in combination as needed, or matters described in a certain embodiment or item may be applied to matters described in a different embodiment or item as long as they do not contradict. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-15495 filed on Jan. 25, 2008, the entire contents of which are hereby incorporated by reference.

The invention claimed is:

1. A transmitting apparatus in a mobile communications system, comprising:
    a data modulating circuit which maps a predetermined number of data sets to one or more reference signal points of a symbol constellation;
    an inverse Fourier transforming circuit which inverse Fourier transforms a data-modulated signal, generating a time-domain signal;
    a peak suppressing circuit which suppresses the time-domain signal such that a peak power decreases when the time-domain signal meets a predetermined condition;
    a Fourier transforming circuit which Fourier transforms the peak-suppressed signal and generates a frequency-domain signal;
    a modifying circuit which modifies the frequency-domain signal, and provides the modified signal to the inverse Fourier transforming circuit, wherein, the modifying circuit, is arranged to move, when a peak-suppressed signal point in the symbol constellation does not belong to a predetermined surrounding area which surrounds the respective reference signal points, the peak-suppressed signal point to a point within the surrounding area, wherein
    for a data sub-carrier, the peak-suppressed signal point is arranged to be moved to the point within the surrounding area when the peak-suppressed signal point in the symbol constellation does not belong to the predetermined surrounding area which surrounds each of the reference signal points, and for a null sub-carrier, the peak-suppressed signal point is arranged to be moved such that a peak-suppressed signal power takes a value which is no more than a predetermined value.

2. The transmitting apparatus as claimed in claim 1, wherein the predetermined condition is that a peak voltage of the time-domain signal exceeds a predetermined value.

3. The transmitting apparatus as claimed in claim 1, wherein, when the peak-suppressed signal point in the symbol constellation does not belong to the predetermined surrounding area which surrounds the respective reference signal points, the peak-suppressed signal point is moved to a reference signal point within the surrounding area.

4. The transmitting apparatus as claimed in claim 1, wherein, when the peak-suppressed signal point in the symbol constellation does not belong to the predetermined surrounding area which surrounds the respective reference signal points, the peak-suppressed signal point is moved to a point on a border of the surrounding area.

5. The transmitting apparatus as claimed in claim 4, wherein one of orthogonal modulation components is arranged to be equally maintained between the peak-suppressed signal point and the point on the border.

6. The transmitting apparatus as claimed in claim 4, wherein the point on the border of the surrounding area is arranged to be positioned on a straight line which links two points, one of which points being before the peak suppression and the other being after the peak suppression.

7. The transmitting apparatus as claimed in claim 1, wherein each of the surrounding areas is arranged to be a circular area which surrounds a reference signal point corresponding to each.

8. The transmitting apparatus as claimed in claim 1, wherein each of the surrounding areas is arranged to be a square area which surrounds a reference signal point corresponding to each.

9. The transmitting apparatus as claimed in claim 1, wherein the transmitting apparatus is provided at a radio base station of the mobile communications system.

10. The transmitting apparatus as claimed in claim 1, wherein the transmitting apparatus is provided at a user apparatus of the mobile communications system.

11. A method for use in a transmitting apparatus in a mobile communications system, comprising:
a data modulating step of mapping a predetermined number of data sets to a reference signal point within a symbol constellation;
an inverse Fourier transforming step of inverse Fourier transforming a data-modulated signal, generating a time-domain signal;
a peak suppressing step of suppressing the time-domain signal such that a peak power decreases when the time-domain signal meets a predetermined condition;
a Fourier transforming step of Fourier transforming the peak-suppressed signal and generating a frequency-domain signal;
a modifying step of modifying the frequency-domain signal, and make the modified signal the data-modulated signal in the inverse Fourier transforming step, wherein the modifying step is arranged to move, when a peak-suppressed signal point in the symbol constellation does not belong to a predetermined surrounding area which surrounds the respective reference signal points, the peak-suppressed signal point to a point within the surrounding area, wherein
for a data sub-carrier, the peak-suppressed signal point is arranged to be moved to the point within the surrounding area when the peak-suppressed signal point in the symbol constellation does not belong to the predetermined surrounding area which surrounds each of the reference signal points, and
for a null sub-carrier, the peak-suppressed signal point is arranged to be moved such that a peak-suppressed signal power takes a value which is no more than a predetermined value.

12. The method as claimed in claim 11, wherein the transmitting apparatus is a radio base station which wirelessly communicates with a user apparatus.

13. The method as claimed in claim 12, wherein the method is used for the user apparatus conducting a signal transmission at a rate lower than a predetermined transmission rate.

14. The method as claimed in claim 11, wherein the transmitting apparatus is a user apparatus which wirelessly communicates with a radio base station.

* * * * *